No. 863,008. PATENTED AUG. 13, 1907.
W. E. SUMPNER.
ELECTRICAL MEASURING INSTRUMENT.
APPLICATION FILED OCT. 19, 1905.
3 SHEETS—SHEET 1.
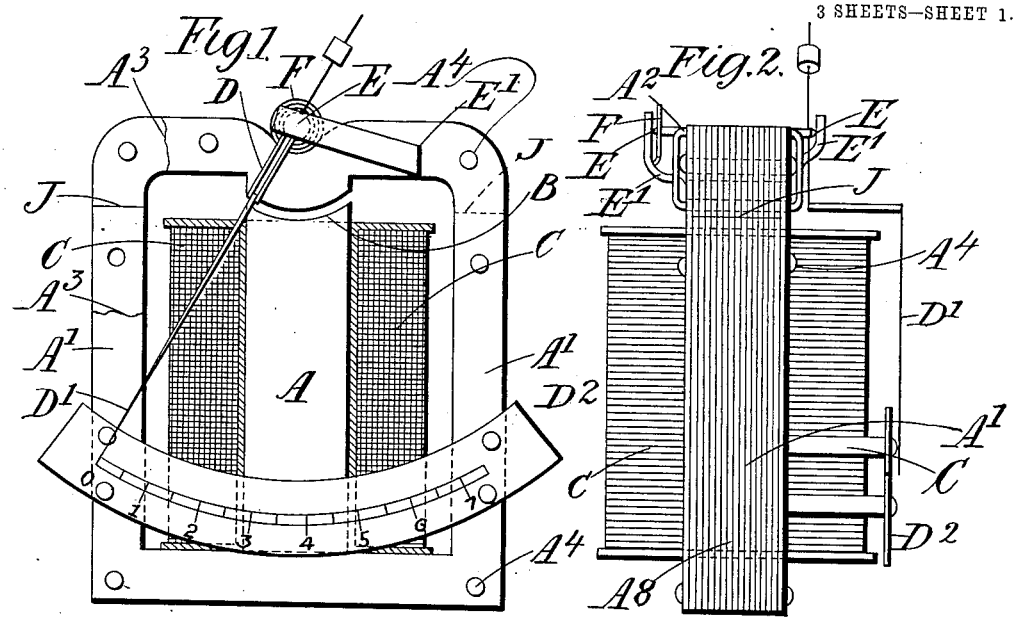
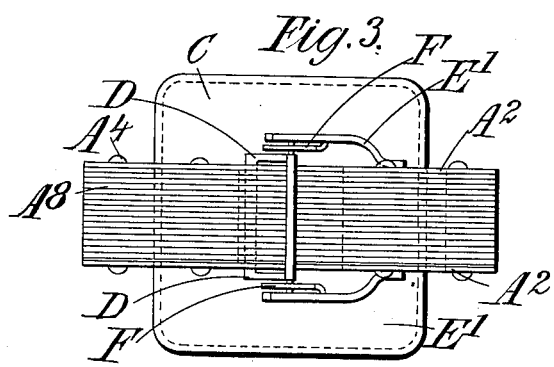
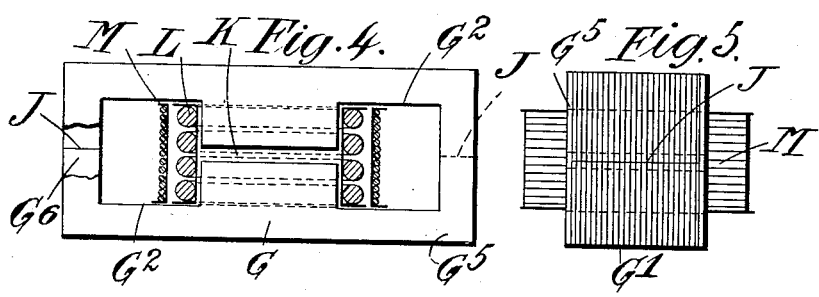
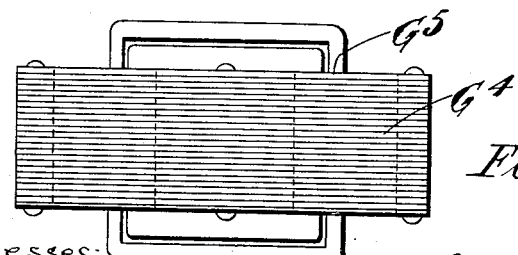
Witnesses
Thomas Durant
Melville D. Church
Inventor:
William E. Sumpner
by Church & Church
his Attys.

No. 863,008. PATENTED AUG. 13, 1907.
W. E. SUMPNER.
ELECTRICAL MEASURING INSTRUMENT.
APPLICATION FILED OCT. 19, 1905.

3 SHEETS—SHEET 2.

Witnesses:
Thomas Durant
Melville W. Church

Inventor:
William E. Sumpner
by Church & Church
his Atty

No. 863,008. PATENTED AUG. 13, 1907.
W. E. SUMPNER.
ELECTRICAL MEASURING INSTRUMENT.
APPLICATION FILED OCT. 19, 1905.

3 SHEETS—SHEET 3.

Witnesses
Thos Durant
Harry C. Bates.

Inventor
William E. Sumpner
by Church & Church
his Attys.

UNITED STATES PATENT OFFICE.

WILLIAM EDWARD SUMPNER, OF BIRMINGHAM, ENGLAND.

ELECTRICAL MEASURING INSTRUMENT.

No. 863,008.  Specification of Letters Patent.  Patented Aug. 13, 1907.

Application filed October 19, 1905. Serial No. 283,446.

*To all whom it may concern:*

Figure 10:
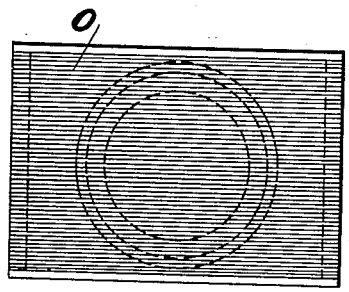

Be it known that I, WILLIAM EDWARD SUMPNER, a citizen of the British Empire, and a resident of Birmingham, in Warwickshire, England, have invented certain new and useful Improvements in Electrical Measuring Instruments; and I do hereby declare the following to be a full, clear, and exact description of the same, reference being had to the accompanying drawings, forming a part of this specification, and to the figures and letters of reference marked thereon.

This invention relates to instruments of the dynamometer class intended for use on alternating current circuits. In order to strengthen the magnetic field of such instruments, and thereby render the same more sensitive, it is desirable to use iron in their construction; but the use of iron, as is well known leads to instrument error due to variable permeability, hysteresis, etc.

Attempts have hitherto been made to embody iron cores in the coils of alternating current instruments, but without the desired results, as these instruments while capable of being accurately calibrated for working within certain limits are inaccurate when those limits are exceeded.

The object of the present invention is to enable iron to be utilized without giving rise to errors from the causes aforesaid.

Every instrument of the dynamometer class operates by the action of a magnetic field F caused by the current in a fixed coil on a current C, traversing a moving coil. The average value of the product FC is made a measure of the quantity to be indicated, and to secure this result it has hitherto been thought necessary to make the instantaneous value of the product F.C proportional to the instantaneous value of the quantity to be indicated. In a watt meter one of these quantities, e. g. F, is made proportional to the circuit current, and the other, C, to the circuit voltage; while in a volt meter both F and C are made proportional to the circuit voltage. It is easily possible to make the magnetizing current proportional to the quantity, or to one of the quantities, to be measured, even when iron is used to increase the strength of the field F; but in the latter case, owing to the physical properties of the iron, it is impossible to make F accurately proportional to the magnetizing current.

In the construction of my instruments I do not attempt to make F proportional to the magnetizing current, and I do not attempt to make the instantaneous value of FC proportional to the instantaneous value of the quantity to be measured, but I adopt quite a new principle which may be explained in mathematical language as follows:—If F and G are any two quantities varying with time (denoted by $t$) we always have
$$F\frac{dG}{dt} + G\frac{dF}{dt} = \frac{d(FG)}{dt}.$$

If in addition F and G are periodic quantities of period T, the average value of each of the three terms in the above equation will be proportional to the corresponding integral taken over the complete period T. Moreover since the product FG is itself periodic, the integral of the right hand side of the above equation will be zero for any complete period T. Hence the average values of the two products $$F\frac{dG}{dt} \text{ and } G\frac{dF}{dt}$$
will be equal to each other numerically, although opposite in sign, and although at any given instant these products may have very different values.

To show the application of this principle, suppose F to be the field of an alternating electromagnet, and that $$C = \frac{dG}{dt}$$

is the alternating current flowing in a coil movable in this field. The average of the product $$F\frac{dG}{dt}$$

will then be the same as the average of the product FC determining the deflection of the instrument; while it follows from the above equation that this average is numerically equal to the average value of the product $$G\frac{dF}{dt}.$$

If now means can be devised to make $$\frac{dF}{dt}$$

proportional to the voltage V of the circuit, and if other means can be devised to make

$$C = \frac{dG}{dt}$$

where G is proportional either to the circuit current A, or to the circuit voltage V, the deflection of the instrument will be determined by the average of the product VA, or by the average of the product VV, respectively. The instrument can consequently be calibrated in the first case to measure the power in watts and in the second case to measure the circuit voltage. My invention therefore involves the employment of two distinct but complementary parts, namely, (1) an electromagnet, excited by the voltage V of the circuit, and so constructed that the magnetic field F produced in the air gap is such that at every moment $$V = a\frac{dF}{dt}$$
where $\alpha$ is some constant. (2) a "quadrature transformer" for the purpose of producing a current C through a coil movable in the air gap of the electromagnet the said transformer being so constructed that $$C = \beta \frac{dG}{dt}$$

where $\beta$ is some constant, and where G is the circuit current A in the case of a watt meter, and the circuit voltage V in the case of a voltmeter.

As regards the electromagnet, the distance between the adjacent pole faces of the air gap must be small i. e. the air gap must be short, and the magnetic field F in this gap will then be proportional to the total magnetic flux through the iron core. If the winding has a resistance $r$ the magnetizing current $\gamma$ produced by a voltage V will be such that $$V = r\gamma + \alpha \frac{dF}{dt}$$

where $\alpha$ is some constant the value of which will not be dependent on the physical properties of the iron, such as permeability, hysteresis, etc. If now the magnet be so designed that the resistance $r$ of the coil is negligible compared with its impedance (for practical purposes it is sufficient in the case of a wattmeter to make $r$ less than one per cent of the impedance under working conditions, and in the case of the voltmeter to make $r$ less than about five per cent of the impedance) the term $r\gamma$ will be negligible as compared with V, and we shall have with sufficient accuracy $$V = \alpha \frac{dF}{dt}$$

where $\alpha$ is a constant, and the field F in the air gap will be related to the voltage V in a manner unaffected by variation in the physical properties of the iron, so that such variations will not effect the accuracy of the instrument.

As regards the "quadrature transformer" the structure of this will depend upon the purpose of the instrument. For a wattmeter a "quadrature current transformer" will be required. This will consist of two relatively fixed coils of wire having a constant coefficient of mutual induction M. The primary coil is traversed by the main current A, while the secondary has its circuit completed through the moving coil. A large non-inductive resistance R is included in the secondary circuit in order to make such circuit non-inductive. Under these circumstances the secondary, or moving coil, current C will be given by the equation $$C = \frac{M}{R} \frac{dA}{dt}$$

which is the quadrature relation required.

For a voltmeter a "quadrature voltage transformer" will be needed. This may consist simply of a condenser of capacity K, joined in series with the moving coil, and suitably connected to the circuit whose voltage is to be measured. In this case the moving coil current C will be given by $$C = K \frac{dV}{dt}.$$

Summarizing the above results, $$C = \frac{dG}{dt}$$

where for the wattmeter $$G = \frac{M}{R} A$$

and for the voltmeter $G = KV$ and where K M and R are constants, also $$V = \alpha \frac{dF}{dt}$$

where $\alpha$ is constant. Therefore at every instant $$F \frac{dG}{dt} + G \frac{dF}{dt} = FC + \frac{1}{\alpha} GV.$$

But it has been shown that the average value of the left hand side of this equation is zero. Hence the average value of the right hand side of this equation is also zero. This means that the average value of FC is numerically equal to the average value of $$\frac{1}{\alpha} GV,$$

though of opposite sign. Since the sign merely determines the direction in which the index is deflected it may be disregarded. The torque on the moving coil is measured by the average value of FC and thus is proportional to the average product of GV. It is thus proportional to the average product of AV in the case of a wattmeter, and to the average value of $V^2$ in the case of a voltmeter.

In carrying my invention into effect I employ a laminated ironcored electromagnet excited by the circuit voltage, either directly or through a voltage transformer as is commonly used when necessary for high voltage circuits. I construct the electromagnet with a nearly closed iron magnetic circuit, the air gap being only large enough to permit the free motion of a moving coil. The coil of the electromagnet must be designed so that its resistance is negligible compared with its impedance, that is to say so that the product of the current through the coil and its resistance, forms a negligibly small proportion of the whole voltage to which the coil is subjected. To insure this, the magnetic reluctance of the air gap must be made very small by diminishing its length and increasing its cross section as much as possible; the electromagnet must be so shaped as to allow as much space as possible for the magnetizing coil; and this coil should be wound so as to occupy the whole of the available winding space. The number of turns on the coil will be determined by the magnetic flux required, and by the frequency and voltage to which the coil is to be subjected; while the thickness of the wire used will be determined by the number of turns required in the available winding space, the condition in the case of wattmeters being observed that the ohmic resistance must not be more than about one per cent of the impedance, and in the case of voltmeters not more than about five per cent.

The current in the moving coil is generated by the quadrature transformer. If the instrument is to be used as a wattmeter this quadrature transformer must consist of two relatively fixed coils the primary of which is placed in the main circuit and the secondary in series with a suitable resistance and the moving coil. The quadrature current transformer must be so designed that the magnetic flux produced is at any instant strictly proportional to the current through the primary at that instant and the secondary circuit must be such that the demagnetizing action of the secondary current on this flux is negligible. The magnetic circuit must be the same for both primary and secondary coils.

The coils may be shielded from external magnetic influences by placing them within a shell of suitably laminated iron, but if iron is used there must in all cases be an air gap in the magnetic circuit and the magnetic reluctance of this circuit must be almost entirely that of the air gap. Under these conditions the deflection of the pointer attached to the moving coil, as read on a properly calibrated scale, will be a measure of the mean value of the product of the circuit voltage and circuit current; that is it will be a measure of the watts, the accuracy of which will not be affected by altering the magnitude of the voltage or current, or by changes in their frequency, or wave form, or phase relation or by variations in the permeability, hysteresis, or eddy current effects due to the presence of an iron core in the electromagnet.

If the instrument is to be used as a voltmeter the quadrature transformer required is simply an ordinary condenser placed in series with the moving coil, the combination being connected to the voltage to be measured.

The moving coil may be constructed and controlled in a manner similar to that commonly used in moving coil instruments intended for use on direct current circuits, but care must be taken to make the frame work of the coil in such a way, or of such material as to avoid the production of eddy current, or of induced magnetism, by the alternating field.

The hereinbefore described construction is given by way of example, setting forth the principles involved in this invention, and the method of carrying them into effect, but the spirit and scope of this invention are not limited to any precise construction provided the conditions and methods described are observed and employed.

Figure 7:
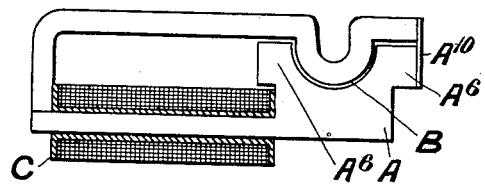
Figure 8:
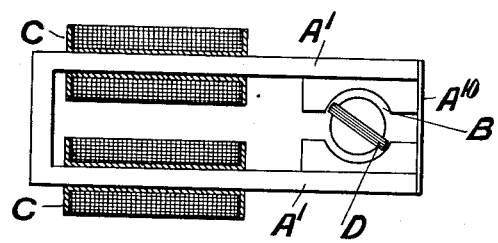
Figure 9:
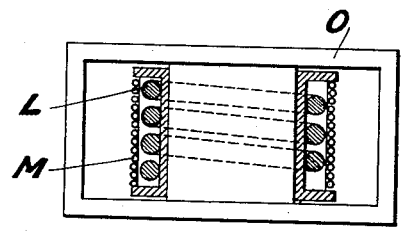
Figure 11:
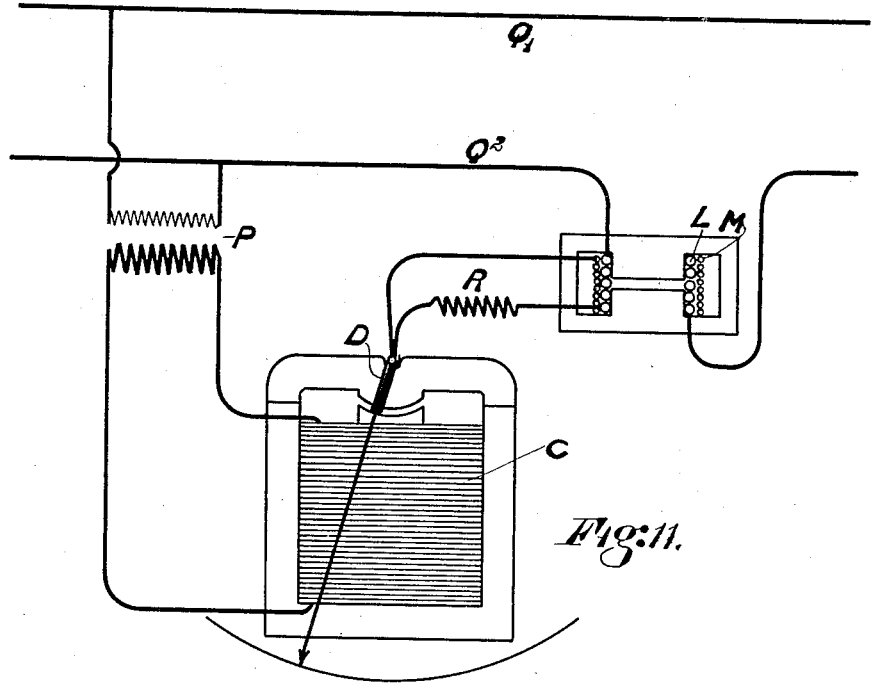
Figure 12:
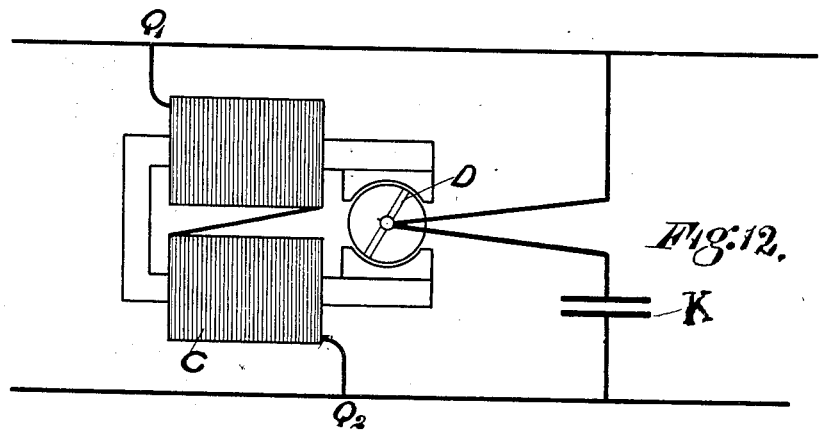

In the accompanying drawings:—Figure 1 is a front elevation in part section, Fig. 2, a side elevation, Fig. 3, a plan of the indicating or electromagnet portion of one form of wattmeter constructed in accordance with this invention. Fig. 4 is a front elevation in part section, Fig. 5 side elevation, and Fig. 6 a plan of one form of current transformer for use in a wattmeter according to this invention. Figs. 7 and 8 are diagrammatic views of alternative constructions of the electromagnet portion. Fig. 9 is a front elevation, and Fig. 10 a plan of a shielded current transformer. Fig. 11 is a diagram of electrical connections for a wattmeter according to this invention, while Fig. 12 shows the connections for a voltmeter.

In reference to the Figs. 1, 2, 3 of the accompanying drawings, A is the central core of an electromagnet having a return magnetic path by the side limbs A' through the air gap B. The iron circuit is laminated as is usual with alternating current apparatus, the laminations being indicated at $A^8$ in Figs. 2 and 3. Stout end plates $A^2$ are employed to clamp the laminæ together by means of rivets, bolts, or screws indicated at $A^4$. One of these plates is shown partially broken away at $A^3$ in Fig. 1, to more clearly show the joint J in the magnetic circuit, where the upper portions of the iron circuit, formed separate from the lower, is joined on to the lower portion. The object of this joint J in Figs. 1, 2, and 3, is to permit of the moving coil D being wound on a former and slipped into position when made and also to permit of the magnetizing coil C, which energizes the electromagnet, being similarly wound upon a bobbin and slipped into position upon the central core A. The moving coil D is rectangular in shape and pivoted at E so as to swing about one of its edges as an axis, the opposite edge contains the conductors which lie in the air gap B. The coil is pivotally supported in any desirable manner such as between two bent plates, of brass, E', and is provided with connecting and controlling springs F as is usual with moving coil instruments. The pivoted system may further be provided with a damping disk and permanent magnet or with any other form of damping arrangement usual in electrical measuring instruments, but such device is omitted from the drawings for the sake of clearness.

A pointer and scale are shown at D' and $D^2$ respectively.

The current transformer illustrated in Figs. 4, 5, 6, comprises a laminated iron framework made in two parts forming a central core G around which the transforming coils are wound, and having an air gap K, the magnetic path which must be common for both coils being completed by the portions $G^2$. The laminæ which are indicated in two places at $G^4$ are clamped between stout end plates $G^5$, one of which is broken away at $G^6$ in Fig. 4 in order to expose to view one of the joints J between the upper and lower parts of the iron circuit. The joints as shown at J are for the purpose of ease of construction, enabling the coils to be wound on bobbins and the two halves of the iron portion to be placed in position relatively to the coils, and then held in position by the end plates $G^5$ to which they are finally clamped.

As hitherto stated it is desirable to make the cross section of the air gap in which the movable coil of the instrument is mounted as large as possible. This is especially the case with wattmeters. When the instrument is required to give even greater accuracy than can be obtained with the form shown at Figs. 1 to 3, I make the cross section of the air gap considerably larger than is required for the movement of the coil D. Fig. 7 shows an electromagnet having such an air gap, the enlargement of cross section being obtained by increasing the length of the adjacent curved faces of the pole pieces and return magnet circuit and by the provision of extensions $A^6$. The employment of an air gap having a cross section which is as large as possible is advantageous in that it reduces the total reluctance of the magnetic path and increases the flux through the exciting coil or coils without increasing the magnetizing current, and without diminishing the density of the flux cut by the conductors of the moving coil. The free ends of the magnet core are clamped together by a metal plate $A^{10}$ in order to retain the portions adjacent to the air gap at a fixed distance apart.

I may in some cases prefer to employ what may be termed a double air gap type of construction, as is indicated in Fig. 8. In this construction, however, a greater magnetizing current is needed. A stationary block A of laminated iron disks is secured between the pole pieces of the limbs A′ to produce the required form of air gap.

Figs. 9 and 10 refer to a shielded form of current transformer which is similar in operation to that hereinbefore described. The air gap is dispensed with, and the primary coil L, and the secondary coil M, are both wound upon the same central bobbin of non-magnetic material (which is the equivalent of the air gap since the permeability of such material is the same as that of air) and inclosed within a casing O, of laminated iron. It will be observed that the casing O is wider than the corresponding part $G^4$ in the Figs. 4—6, the main object being to protect the coils L and M from disturbance by external magnetic influences, but a further advantage is obtained in that the flux due to the primary current is thereby increased and that fewer secondary turns are required. For use in laboratories and places where magnetic disturbance may be easily avoided, the shield may be dispensed with.

In Fig. 11 are shown circuits of the wattmeter when measuring the power in a circuit whose voltage is higher than it is desirable to apply directly to the coil of the electromagnet. Q′, $Q^2$, are the two main leads supplying the power to be measured, P is a voltage transformer the secondary of which supplies the coil C of the wattmeter. L represents the primary coil of the current transformer, M the secondary, and D the moving coil in the instrument. R is a noninductive resistance placed in series with the coil D, made preferably of a material having a low temperature coefficient. The primary coil L, instead of being placed in one of the main leads as $Q^2$ may form part of the secondary circuit of an ordinary current transformer whose primary is placed in one of the mains. It will be understood that when the circuit voltage is sufficiently low the transformer P is not required. Fig. 12 shows the connections when my invention is applied to the measurement of volts. The indicating part of the instrument is that shown at Fig. 8. Any other form of my instrument may however, be equally well employed. In place of the transformer LM a condenser K is used, and this is connected to points on the mains Q′ $Q^2$ as shown as well as in series with the coil D.

A satisfactory experimental instrument having this invention applied thereto, although not attaining the accuracy which may be reached, has been constructed according to the following data. The magnetizing coil C consists of about 1000 turns of copper wire having a resistance of 3 ohms, and an impedance which at all ordinary current frequencies exceeds 300 ohms or more than 100 times the resistance; the number of turns on the moving coil is 10; the length of the air gap, one-eighth of an inch; the sectional area of the electromagnet stampings, measured in a direction at right angles to the flux, is two square inches. This instrument proved suitable for 100 volts at any frequency lying between 30 and 100 cycles per second or at a frequency of 80 for any voltage between 30 and 300 volts, and gives commercially accurate results with power factors lying between 0.3 and 1.0. The current transformer used with this instrument has a primary winding of 40 turns of wire intended to carry 10 amperes, and might equally well have been provided with 4 turns for a current of 100 amperes, and so on. The secondary winding has 40 turns of finer wire, the two windings being in the position shown in Figs. 4 and 5. A non-inductive resistance of 100 ohms is connected in series with the moving coil, as indicated at R in Fig. 11. The sectional area of the magnetic circuit at right angles to the flux is two square inches and the length of the air gap is quarter-inch.

The term "air gap" employed in this specification, as relating to the space between opposing iron magnetic surfaces is not confined to such a space when filled with air, but is intended to include any such gap when filled with a fluid non-magnetic medium, such, for example, as oils.

Having thus described my invention what I claim and desire to secure by Letters Patent is:—

1. In measuring instruments for alternating current circuits, the combination comprising an electromagnet adapted to produce a magnetic field in which the rate of change is proportional to the circuit voltage, a coil movable within the said field, and a quadrature transformer adapted to supply the said moving coil with currents proportional to the rate of change of one of the factors entering into the quantity to be measured, substantially as set forth.

2. In measuring instruments for alternating current circuits, the combination comprising an electromagnet adapted to produce a magnetic field in which the rate of change is proportional to the circuit voltage, a moving coil mounted within the said field, and a quadrature transformer adapted to supply the said coil with current proportional to the rate of change of the circuit current, substantially as set forth.

3. In measuring instruments for alternating current circuits, the combination comprising an electromagnet adapted to produce a magnetic field in which the rate of change is proportional to the circuit voltage, a moving coil mounted within the said field, a transformer whose secondary circuit is connected to the said moving coil and having a common magnetic circuit for both the primary and secondary currents and an air gap in the said magnetic circuit, substantially as set forth.

4. In measuring instruments for alternating current circuits, the combination comprising an electromagnet adapted to produce a magnetic field in which the rate of change is proportional to the circuit voltage, a moving coil pivotally mounted within the said field, a transformer whose secondary circuit is connected to the said moving coil and having a common magnetic circuit for both the primary and secondary currents, an air gap in the said magnetic circuit, and a non-inductive resistance arranged in the secondary circuit of the said transformer, substantially as set forth.

5. In measuring instruments for alternating current circuits, the combination comprising a laminated iron core, a laminated iron return magnetic circuit arranged in conjunction with the said core, an air gap of small reluctance between the core and return magnetic circuit, a stationary coil placed around the core, the resistance of the coil being negligible compared with the impedance, a coil movable within the said air gap, and a quadrature transformer adapted to supply the said movable coil with current proportional to the rate of change of one of the factors entering into the quantity to be measured, substantially as set forth.

6. In measuring instruments for alternating current circuits, the combination comprising a laminated iron core, a laminated iron return magnetic circuit arranged in conjunction with the said core, laminated polar extensions of the said core, a narrow air gap of small reluctance between the said core and polar extensions and the return magnetic circuit, a stationary coil placed around the core, the resistance of the coil being less than one per cent of the impedance, a coil movable within the said air gap, and a quadrature transformer adapted to supply the said movable coil with current proportional to the rate of change of one of the factors entering into the quantity to be measured, substantially as set forth.

In testimony whereof I have signed my name to this specification in the presence of two subscribing witnesses.

WILLIAM EDWARD SUMPNER.

Witnesses:
 ALBERT EDWARD SEYMOUR,
 SIDNEY GEO. WEBB.